United States Patent Office 3,458,537
Patented July 29, 1969

3,458,537
1-(p-BENZYLOXYANILINO)-4-HYDROXY-
ANTHRAQUINONES
Grannis S. Johnson, Englewood, N.J., assignor to
GAF Corporation, New York, N.Y., a corporation
of Delaware
No Drawing. Filed Mar. 31, 1966, Ser. No. 538,943
Int. Cl. C09b 1/50
U.S. Cl. 260—380    6 Claims

ABSTRACT OF THE DISCLOSURE

An anthraquinone dyestuff of the general formula

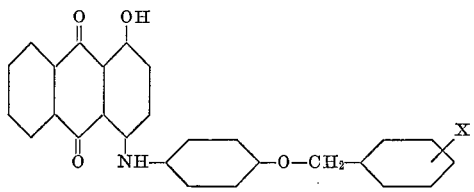

wherein X represents a radical selected from the group consisting of hydrogen, halogen, hydroxy, lower alkoxy, trifluoromethyl, nitro, lower alkyl carboxylic acid esters, and

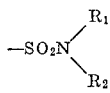

wherein $R_1$ and $R_2$ each independently represent a radical selected from the group consisting of hydrogen, lower alkyl, hydroxy lower alkyl, cyano lower alkyl, hydroxy alkoxyalkyl, hydroxypolyalkoxyalkyl and taken together a morpholino radial. Use of the above dyestuff for dyeing polyester materials.

---

The present invention relates to the production of new dyestuffs of the anthraquinone series and more particularly to the new anthraquinone compounds and their application to the art of dyeing or coloring.

The need for a range of blue dyestuffs which are fast to light, sublimation, and have good building-up properties when applied to polyester materials in bulk or fiber form, such as Dacron (polyethylene terephthalate) has long been recognized. Process dyeing of polyester textile materials has presented difficulties, for while it is known that many disperse dyes possess affinity for polyester textile fibers, many of these dyes exhibit poor building-up properties, poor light fastness and poor sublimation when applied to polyester materials by the well known Thermasol process and Koratron process, a crease resistant treatment.

Polyester fabrics are usually heat set, after dyeing, at temperatures which often reach 425° F. If the dye is not fast to sublimation it will be removed in part, at least, from the goods during this operation. Some dyes, otherwise suitable for dyeing polyester fabrics, are unsuitable because they are not fast to sublimation. The new anthraquinone compounds of our invention yield dyeings on the textile materials indicated herein which have excellent fastness to sublimation.

It is an object of this invention to provide new anthraquinone compounds. Another object is to provide a satisfactory process for the preparation of my new anthraquinone compounds. Another object is to provide a process of dyeing polyester textile materials with these new dyestuffs. A further object is to provide polyester textile materials dyed herewith. A particular object is to provide dyed polyethylene terephthalate textile materials which have good fastness properties. Other objects of this invention are apparent from the following description.

The attainment of the above objects is made possible by the present invention which broadly comprises new anthraquinone dyes having the general formula:

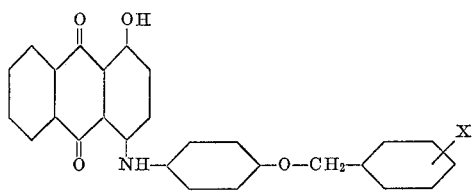

wherein X represents a radical selected from the group consisting of hydrogen, halogen, i.e., chlorine, bromine, iodine and fluorine, hydroxy, lower alkoxy, such as, methoxy, ethoxy, etc., trifluoromethyl, nitro, lower alkyl carboxylic acid esters, such as —COOCH$_3$, —COOC$_2$H$_5$, etc., and sulfonamido radicals, such as

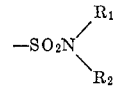

wherein $R_1$ and $R_2$ are selected from the group consisting of hydrogen, alkyl, hydroxyalkyl, hydroxyalkoxyalkyl, hydroxypolyalkoxyalkyl, cyanoalkyl and when taken together a heterocyclic ring such as,

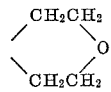

Among the preferred dyestuffs are those compounds wherein X represents hydrogen or chlorine, especially hydrogen and wherein X is in the para position to the —CH$_2$— radical. These new dyestuffs dye polyester materials, especially Dacron, in bulk or fiber form, blue shades and are fast to light, sublimation and exhibit good building-up properties when applied by the Thermasol process. In addition to polyester the dyestuffs of this invention may be employed for coloring other natural or synthetic polymeric material in bulk, film or fiber form, including cellulose acetate, polyamides, and polyacrylonitrile and the like, and as nylon, Orlon, Acrilan, Dynel, and the like.

It will be readily understood that the compounds of the instant invention may be substituted in the benzene nuclei of the aminophenyl benzyl ether substituent and in the 2, 3, 5, 6, 7 and 8 positions of the anthraquinone nucleus by inert substituents which do not detract from the properties desired in the final dyestuff.

As pointed out, the dyestuffs of this invention are suitable for application by so-called Thermosol process described, for example, in U.S. Patents 2,415,379; 2,447,993; 2,487,197 and 2,663,612, in which process the fabric to be dyed is impregnated, advantageously at a temperature not exceeding 60° C., with an aqueous dispersion of the dyestuff that advantageously contains 1 to 50% of urea and thickening agent, such as sodium alginate or more often a copolymer derived from acrylic acid, and then squeezed in the usual manner. Advantageously, the fabric is squeezed in such a manner that it retains 50 to 100% of dye liquor, calculated on its dry weight. In order to bring about fixation of the dyestuff, the fabric thus impregnated is heated to a temperature above 100° C., for example, between 180 and 210° C., advantageously after an intermediate drying, for example, in a current of hot air.

Moreover, the sublimation fastness of the instant dyestuffs also renders them useful for coloring polyester and polyester blends that are to be treated by the Koratron process (a wrinkle resistant finish). An example of a suitable Koratron process involves padding the fabric, e.g., a Dacron/cotton blend, to be dyed at 120° F. with a paste comprising 25% of a 38% solution of methylene dihydroxy dimethyol ethylene urea, 18% of a buffered zinc nitrate catalyst, 3% of a polyethylene emulsion, 2% of a mixture containing nonionic and amphoteric surfactants, i.e., fabric softeners, 0.25% of a nonionic surfactant, e.g., Igepal CO-630 and 2% of a 40% emulsion of an acrylate copolymer to impart abrasion resistance. The padded fabric is then dried at 275° F. and cured for 15 minutes at 340° F.

The new dyestuffs of this invention may be obtained by condensing quinizarin, 1,4-dihydroxy anthraquinone, with an aminophenyl benzyl ether of the formula:

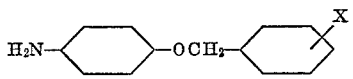

in which X has the values given above. Catalysts and acid binding agents may be employed, if desired, and the reaction may be carried out preferably in the absence of water and in an inert organic diluent.

Examples of a aminophenyl benzyl ether which one may employ are:

Benzyloxyaniline
4-aminophenyl-4-chlorobenzyl ether
4-aminophenyl-3-chlorobenzyl ether
4-aminophenyl-2-chlorobenzyl ether
4-aminophenyl-4-bromobenzyl ether
4-aminophenyl-3-bromobenzyl ether
4-aminophenyl-2-bromobenzyl ether
4-aminophenyl-4-methoxybenzyl ether
4-aminophenyl-3-methoxybenzyl ether
4-aminophenyl-2-methoxybenzyl ether
4-aminophenyl-4-ethoxybenzyl ether
4-aminophenyl-3-ethoxybenzyl ether
4-aminophenyl-2-ethoxybenzyl ether
4-aminophenyl-4-trifluoromethylbenzyl ether
4-aminophenyl-4-nitrobenzyl ether
4-aminophenyl-4-carbomethoxybenzyl ether
4-aminophenyl-4-sulfonamidobenzyl ether
4-aminophenyl-3-sulfonamidobenzyl ether
4-aminophenyl-4-N-methylsulfonamidobenzyl ether
4-aminophenyl-4-N,N-dimethyl sulfonamidobenzyl ether
4-aminophenyl-4-N,N-bis(2-cyanoethyl) sulfonamidobenzyl ether
4-aminophenyl-3-N-(2-hydroxyethyl) sulfonamidobenzyl ether
4-aminophenyl-4-N,N-bis(2-hydroxyethyl) sulfonamidobenzyl ether
4-aminophenyl-4-N,N-bis[2-(2-hydroxyethoxy) ethyl]sulfonamidobenzyl ether
4-aminophenyl-4-N,N-bis{2-[2-(2-hydroxyethoxy)-ethoxy]ethyl}sulfonamidobenzyl ether
4-aminophenyl-4-morpholinosulfonamidobenzyl ether The above intermediate, aminophenyl benzyl ethers, may be easily prepared in two synthesis steps. For example, by reacting p-nitrophenol with a benzyl chloride of the formula:

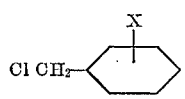

in which X has the values given above, in the presence of alkali hydroxide followed by catalytic hydrogenation of the thus prepared substituted 4-nitrophenylbenzyl ether to its corresponding substituted 4-aminophenylbenzyl ether.

The following examples are illustrative of the present invention and are not to be regarded as limitative. It is to be understood that all parts, percentages and proportions referred to herein and in the appended claims are by weight unless otherwise indicated.

EXAMPLE A

By way of exemplification the intermediate aminophenyl benzyl ethers of this invention may be prepared as follows:

27.8 g. (0.02 mole) of p-nitrophenol was mixed with 200 ml. of ethanol and 11.2 g. (0.20 mole) of potassium hydroxide. This mixture was heated to 80° and refluxed. 32.2 g. of p-chlorobenzyl chloride was added and the resultant mixture heated at reflux until the yellow color due to potassium p-nitrophenoxide disappeared. This required about 18 hours. After this heating period the mixture was cooled to 15° C. and the product filtered off. The filter cake was washed with water and dried in an oven at 85° C. The yield of 4-nitrophenyl-4-chlorobenzyl ether was 31.0 g. (67% of theory) and had a melting point of 112–114° C.

Catalytic hydrogenation of the above nitro product was performed by charging into a one liter steel shaker bomb:

Ethanol _____ ml__ 300
Girdler G-49 catalyst (supported nickel) _____ g__ 3
4 - nitrophenyl - 4 - chlorobenzyl ether (0.152 mole) _____ g__ 40

The steel shaker bomb was purged a total of 6 times, the first 3 times with nitrogen and the next 3 times with hydrogen. The shaker bomb with its contents was heated to 100° C. and hydrogenated at a constant pressure of 75 p.s.i.g. until the hydrogen uptake ceased. The bomb was then cooled to 30° C. and its contents discharged. The discharge mixture was then filtered to remove the catalysts and the filtrate drowned in 2,000 ml. of water. The prepared product was filtered off and dried in an oven at 85° C. The yield of crude product, i.e., the intermediate, 4-aminophenyl-4-chlorobenzyl ether, was 28 g. (79% of theory). Recrystallization of this crude product with cyclohexane yielded white crystals having a melting point of 107–108° C.

The other intermediate aminophenyl benzyl ethers mentioned above, may also be prepared in a manner analogous to that of the preceding process.

EXAMPLE I

1-[4-(4-chlorobenzyloxy) anilino]-4-hydroxy anthraquinone

This new anthraquinone dyestuff was prepared by charging into a 250 ml. reaction flask:

Butanol _____ ml__ 100
Quinizarin (0.05 mole) _____ g__ 12.0
4 - aminophenyl - 4 - chlorobenzyl ether (0.055 mole) _____ g__ 13.0
Boric acid _____ g__ 3.5
Pyridine _____ ml__ 3.5
Zinc dust _____ g__ 1.0

After stirring for 30 minutes, 2.5 ml. of concentrated hydrochloric acid was added and the mixture heated at reflux (100-115° C.) for 22 hours. The reaction mixture was then cooled to 30° C., filtered, and the filter cake washed with butanol and dried in an oven at 85° C. The yield of subject compound was 18.2 g. (80% based on quinizarin). The dye obtained by this process was applied to Dacron by the Thermasol procedure and exhibited bright reddish blue shades, having excellent building-up properties as well as excellent sublimation fastness and good light fastness.

The dyestuff has the structure:

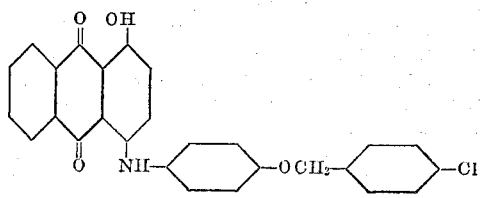

Similar dyestuffs having like properties may be obtained in a manner analogous to that of the above process by replacing the 4-aminophenyl-p-chlorobenzyl ether reactant with other substituted benzyl reactants, such as, 4-aminophenyl - m - chlorobenzyl ether, 4 - aminophenyl - o-methoxybenzyl ether, 4-aminophenyl-m-methoxybenzyl ether, 4-aminophenyl-p-methoxybenzyl ether, 4-aminophenyl-o-ethoxybenzyl ether, 4-aminophenyl-m-ethoxybenzyl ether, 4-aminophenyl-p-ethoxybenzyl ether, 4-aminophenyl - o - hydroxybenzyl ether, 4 - aminophenyl - m - hydroxybenzyl ether and 4-aminophenyl-p-hydroxybenzyl ether.

EXAMPLE II 1-(4-benzyloxyanilino)-4-hydroxy anthraquinone

This new anthraquinone dyestuff was prepared by charging into a 500 ml. flask:

| | |
|---|---|
| Butanol _____ml__ | 150 |
| Quinizarin (0.10 mole) _____g__ | 24.0 |
| Benzyloxyaniline (0.11 mole) _____g__ | 22.0 |
| Boric acid _____g__ | 6.7 |
| Pyridine _____ml__ | 6.7 |
| Zinc dust _____g__ | 2.0 |

After stirring for 15 minutes, 5.0 ml. of concentrated hydrochloric acid was added and the mixture heated at reflux (100–115° C.) for 24 hours. The mixture was then cooled to 30° C. filtered, and the filter cake washed with methanol and dried in an oven at 85° C. The yield of subject compound was 37.0 g. (88% based on quinizarin). The dye obtained by this process was applied to Dacron by the Thermasol procedure and exhibited bright reddish blue shades, having excellent building-up properties as well as excellent sublimation fastness and good light fastness.

The dyestuff has the structure:

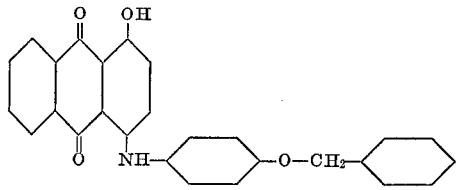

Similar dyestuffs having like properties may be obtained in a manner analogous to that of the above process by replacing the benzyloxyaniline reactant with other substituted benzyl ethers such as 4-aminophenyl-p-trifluoromethylbenzyl ether, 4-aminophenyl-p-nitrobenzyl ether, 4 - aminophenyl - p - carbomethoxybenzyl ether, 4 --aminophenyl-p-sulfonamidobenzyl ether, 4-aminophenyl-p-N-methyl-sulfonamidobenzyl ether, 4-aminophenyl-p-N,N-dimethyl sulfonamidobenzyl ether, 4-aminophenyl-p-N,N-bis (2-cyanoethyl) sulfonamidobenzyl ether, 4-aminophenyl-p-N,N-bis [(2-hydroxyethoxy)ethyl] sulfonamidobenzyl ether, 4-aminophenyl-p-N,N-bis{2-[2-(2-hydroxyethoxy) ethoxy] ethyl}sulfonamidobenzyl ether and 4-aminophenyl-p-morpholinosulfonamidobenzyl ether.

EXAMPLE III

1-[4-(2-chlorobenzyloxy) anilino]-4-hydroxy anthraquinone

This new anthraquinone dyestuff was prepared by following the procedure of Example I except that 13.0 g. (0.055 mole) of 4-aminophenyl-2-chlorobenzyl ether was used in place of 4-amino-phenyl-4-chlorobenzyl ether. The yield of subject compound was 12.3 g. (54% based on quinizarin).

This dyestuff, when applied to Dacron by the Thermasol procedure exhibited blue shades having good building-up properties as well as good sublimation fastness and light fastness.

This dyestuff has the structure:

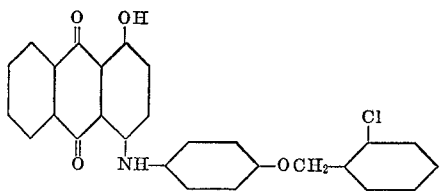

EXAMPLE IV

The anthraquinone compounds of this invention were applied to Dacron in the form of an aqueous dispersion. To illustrate, a padding mixture was made up by mixing 4 oz. of a dispersed paste of dyestuff and 2 oz. of Texapret PT (a copolymer derived from acrylic acid) and diluted to a volume of one gallon with water. The mixture was then charged into the padder and the cloth run through this mixture, the padder being adjusted so that the cloth retained 65 to 70% of its weight of the padding mixture. Drying of the padded cloth in an infrared oven required about 20 seconds. The cloth was then run through the Thermasol oven at 400° C. at such a rate that exposure time was 90 seconds. The dyed cloth was then rinsed, washed with soap and water, rinsed again and dried, yielding blue dyeings exhibiting excellent properties.

Various modifications and variations of this invention will be obvious to a worker skilled in the art and it is understood that such modifications and variations are to be included within the purview of this application and the spirit and scope of the appended claims.

I claim:
1. The anthraquinone dyestuff having the general formula:

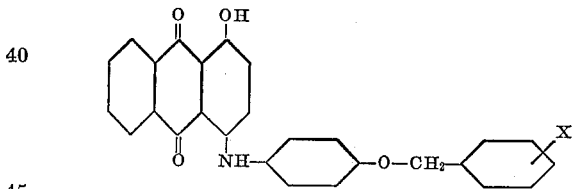

wherein X represents a radial selected from the group consisting of hydrogen, halogen, hydroxy, lower alkoxy, trifluoromethyl, nitro, lower alkyl carboxylic acid esters, and

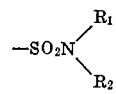

wherein $R_1$ and $R_2$ each independently represent a radical selected from the group consisting of hydrogen, lower alkyl, hydroxy lower alkyl, cyano lower alkyl, hydroxy alkoxyalkyl, hydroxypolyalkoxyalkyl and taken together a morpholino radical.

2. The anthraquinone dyestuff according to claim 1, wherein X represents a radical selected from the group consisting of hydrogen and chlorine.

3. The anthraquinone dyestuff according to claim 1, wherein X is in the para position to the —CH₂— radical.

4. The anthraquinone dyestuff having the general formula:

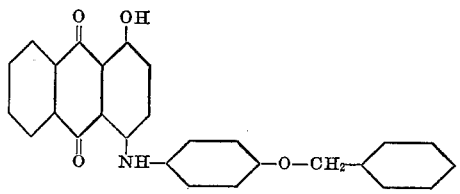

5. The anthraquinone dyestuff having the general formula:
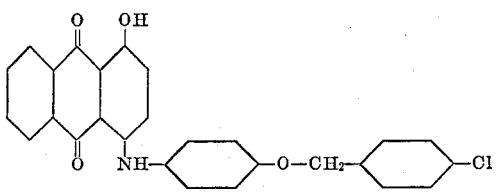
6. The anthraquinone dyestuff having the general formula:
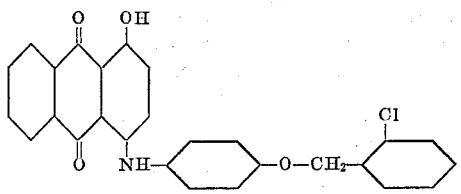
References Cited
UNITED STATES PATENTS
| | | |
|---|---|---|
| 2,677,694 | 5/1954 | Randall et al. _____ 260—380 |
| 2,766,262 | 10/1956 | Belshaw _____ 260—376 |
| 3,214,445 | 10/1965 | Hindermann et al. ____ 260—380 |
| 3,215,710 | 11/1965 | Hindermann et al. ____ 260—380 |
| 3,278,563 | 10/1966 | Hindermann et al. ____ 260—380 |
| 3,255,216 | 6/1966 | Hindermann et al. ____ 260—380 |
LORRAINE A. WEINBERGER, Primary Examiner
H. C. WEGNER, Assistant Examiner
U.S. Cl. X.R.
8—39, 40; 260—247, 373, 376

UNITED STATES PATENT OFFICE
CERTIFICATE OF CORRECTION

Patent No. 3,458,537      Dated July 29, 1969

Inventor(s) Grannis S. Johnson

It is certified that error appears in the above-identified patent and that said Letters Patent are hereby corrected as shown below:

Column 5, line 56, "bis [(2-hydroxyethoxy)ethyl]" should read -- bis [2-(2-hydroxyethoxy)ethyl] --.

SIGNED AND SEALED
NOV 17 1970

(SEAL)
Attest:

Edward M. Fletcher, Jr.
Attesting Officer

WILLIAM E. SCHUYLER, JR.
Commissioner of Patents